United States Patent Office 3,539,340
Patented Nov. 10, 1970

3,539,340
TRANSPARENCIES FOR ELECTROSTATIC COPYING CONSISTING OF POLYESTER SHEETS COATED WITH VINYLIDENE CHLORIDE COPOLYMERS
Thomas J. Dolce, Menlo Park, and Donald L. McCabe, Rahway, N.J., assignors to Celanese Corporation, New York, N.Y., a corporation of Delaware
No Drawing. Filed July 17, 1967, Ser. No. 653,675
Int. Cl. G03g 13/14
U.S. Cl. 96—1.4        9 Claims

ABSTRACT OF THE DISCLOSURE

Transparencies are produced by forming an adherent image upon the modified surface of a transparent polyester sheet by transfer electrostatic copying. The transparent polyester sheet utilized in the invention possesses modified surface characteristics to improve adhesion which result from the presence of a coating thereon of certain vinylidene chloride copolymers.

BACKGROUND OF INVENTION

The invention relates to the production transparencies which may be utilized in visual education presentations wherein images are commonly projected with magnification onto a screen for the simultaneous viewing by a plurality of observers. More particularly, the invention relates to an improved method for efficiently producing a transparency by forming an adherent image upon a polyester sheet.

It has been known for many years that the projection with magnification of an image present upon a transparency may serve as an effective means for conveying information to one or more observers. In some instance such a projection has been accompanied by a spoken or recorded narration or explanation. The production of suitable transparencies or slides of a permanent character suitable for use in such a presentation has, however, heretofore commonly required the skill of a trained technician and the substantial expediture of time and money. For example, transparencies have heretofore commonly been formed by the photographic reproduction of the desired image. Such a photographic reproduction procedure has required the controlled exposure, development, washing, and fixation of a light sensitive compound present on a support with or without the intermediate production of a negative image. Other techniques utilized in the past for the production of transparencies include silk screening, and diazo processes. In order for a transtransparency to give satisfactory service particularly upon repeated use it is essential that the image formed upon the transparent support tightly adhere to same, and not be removed by handling or other contact commonly encountered during use.

It is an object of the invention to provide an efficient and economical process for the production of transparencies.

It is an object of the invention to provide a transparency of a permanent nature which is capable of withstanding repeated use.

It is another object of the invention to provide a process for the production of a transparency utilizing a transparent polyester sheet upon which an adherent image of a permanent character is formed.

It is a further object of the invention to provide a process for production of transparencies which eliminates the need for the skill of a trained technician to produce the same.

These and other objects, as well as the scope, nature, and utilization of the invention will be apparent from the following detailed description and appended claims.

SUMMARY OF INVENTION

It has now been discovered that a process for the efficient production of transparencies comprises forming an adherent image upon a modified surface of a transparent polyester sheet by transfer electrostatic copying, said polyester sheet having at least one surface modified to improve adhesion by the presence of a vinylidene chloride copolymer coating thereon containing about 35 to 97 percent by weight of vinylidene chloride and about 3 to 65 percent by weight of a comonomer having the general formula

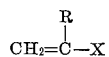

wherein R is hydrogen or a methyl group, X is

or —C≡N, and R' is a $C_1$ to $C_{18}$ alkyl group.

DESCRIPTION OF PREFERRED EMBODIMENTS

Suitable polyester sheet or film materials which may be used in the present invention are formed from condensation produtcs of a bifunctional dicarboxylic acid and a dihydric alcohol and possess dimensional stability at elevated temperatures. The preferred condensation products are formed with aromatic dicarboxylic acids; however, products formed with dicarboxylic acids such as adipic, sebacic, etc. are likewise acceptable. For instance, such polyesters may be of the type described in Carothers U.S. Pat. No. 2,071,250. The polyesters may be composed of any of the high-melting difficultly soluble, usually microcrystalline, cold-drawing, linear, highly polymerized esters of terephthalic acid and glycols of the series $HO(CH_2)_nOH$, where $n$ is an integer within the range of 2 to 10, decreased in Whinfield et al., U.S. Pat. No. 2,465,319. The particularly preferred polyester is polyethylene terephthalate.

Moreover, the polyesters used in accordance with the present invention need not consist solely of dicarboxylic acid and simple glycol units since some of the glycol units may react to form polyglycols, and small percentages of such polyglycol units may also be present. For instance, when ethylene glycol is a reactant, the polyester may contain from 1 to 15 percent by weight of diethylene glycol units, i.e.—$CH_2CH_2OCH_2CH_2O$—.

Preferably the polyester which is utilized in the process is a heat stable highly polymeric linear polyethylene terephathalate sheet which has been biaxially oriented and heat set to provide improved dimensional stability, such as described in Alles U.S. Pat. No. 2,779,684. Orientation and heat setting may be conducted either before or after the vinylidene chloride copolymer coating, described in detail hereafter, is applied. It is preferred, however, that the coating be applied after the polyester sheet has undergone such treatment. A suitable thickness for the uncoated film ranges from about 0.0005 inch to about 0.014 inch. A thickness of about 0.004 inch is particularly preferred.

Attempts to form an adherent image upon the unmodified surface of a polyester sheet by transfer electrostatic copying have resulted in failure. The image formed fails to tenaciously adhere to the sheet and is totally or partially displaced upon contact, thus either completely destroying the image or producing an excessive smudge which renders the transparency unsuitable for further use.

The surface of the polyester sheet utilized in the present invention has been previously modified to improve adhesion by the presence of a coating of certain vinylidene chloride copolymers thereon. The comonomer which is polymerized with vinylidene chloride possesses a general formula of

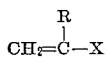

wherein R is hydrogen or a methyl group, X is

or —C≡N, and R' is a $C_1$ to $C_{18}$ alkyl group. The relative proportion of vinylidene chloride in the copolymer may be varied over a relatively wide range. For instance, vinylidene chloride units may comprise about 35 to 97 percent by weight of the copolymer, with the comonomer defined above comprising about 3 to 65 percent by weight of the total. A preferred vinylidene chloride copolymer comprises about 75 to 95 percent by weight vinylidene chloride, and about 5 to 25 percent by weight of the comonomer. A particularly preferred vinylidene chloride copolymer comprises about 90 percent by weight vinylidene chloride, and about 10 percent by weight of the comonomer. Relatively minor amounts, i.e. up to about 20 precent by weight, of ethylenic comonomer units other than those identified above may additionally be present in the vinylidene chloride copolymer provided such units do ot adversely affect the adherence of the image ultimately formed by transfer electrostatic copying. Itaconic acid comonomer units should not be included since such a copolymer has been found to produce poor image adherency.

The comonomer as identified in the above general formula may be an alkyl ester of acrylic or methacrylic acid having 1 to 18 carbon atoms per alkyl group. Acrylonitrile and methacrylonitrile may likewise be selected as the comonomer. Illustrative examples of suitable alkyl acrylic ester comonomers include: methyl acrylate, ethyl acrylate, propyl acrylate, isopropyl acrylate, butyl acrylate, methyl methacrylate, ethyl methacrylate, propyl methacrylate, isopropyl methacrylate, butyl methacrylate, octamethacrylate, n-dodecyl methacrylate, n-octadecyl methacrylate, and the like. Lower alkyl acrylic esters having a more specific general formula of

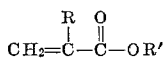

wherein R is hydrogen or a methyl group, and R' is a $C_1$ to $C_8$ alkyl group are the preferred comonomers. The particularly preferred comonomer is methyl acrylate.

The vinylidene chloride copolymers may be prepared by the common polymerization techniques, i.e. emulsion polymerization, solvent polymerization, or mass polymerization. Polymerization in an aqueous emulsion may be conducted, as is well known, by forming an admixture of the comonomers, water, catalyst and activator (e.g. ammonium persulfate and meta sodium bisulfite), and an emulsifying or dispersing agent. Alternatively, the comonomers may be polymerized in bulk without added diluent, such as described in Wiley United States Pat. No. 2,160,945, or the comonomers may be polymerized in an appropriate organic solvent reaction medium. The total catalyst-activator concentration should generally range from about 0.01 to about 2.0 percent by weight based upon the combined weight of the comonomers. Also, about 0.1 to 5.0 percent by weight of a mercaptan based upon the combined weight of the comonomers may be included in the polymerization system to reduce crosslinking and to impart improved solubility to the copolymer.

In a particularly preferred surface modification treatment the vinylidene chloride copolymer is applied to the polyester sheet from an aqueous dispersion, and the water is evaporated. Such aqueous dispersion may be obtained directly from an emulsion polymerization reaction system.

Alternatively, the copolymer may be initially prepared in either a solvent or a bulk polymerization system and subsequently dispersed in an aqueous medium. The aqueous dispersion may contain from about 10 to 70 percent by weight of the solid copolymer. A commercially available vinylidene chloride-acrylic ester copolymer dispersion marketed by the A. E. Staley Manufacturing Co. under the trade designation of Polidene 930 and 933 may be utilized in the present invention. Suitable wetting or dispersing agents may be selected from the conventional types and include alkali metal, ammonium, or amine salts of n-alkane sulfonic acids having 10 to 18 carbon atoms; alkali metal salts of methyl, ethyl, and isopropyl naphthalene sulfonic acid, and the like. The concentration of the dispersing agent required to maintain as stable dispersion may suitably range from about 0.05 to 2 percent by weight based upon the weight of the total system. Additionally, the copolymer may be applied to the polyester sheet from an organic solvent system in which the coating material is totally or partially soluble, with the solvent being evaporated following application. The copolymer coating may be imparted to the polyester sheet by conventional coating techniques which are well known in the coating art. For instance, the polyester sheet may be simply passed through a hopper containing the copolymer in dispersed or dissolved form which is provided with a doctor blade, or the coating may be applied by use of a more precise coating apparatus, such as a gravure press. The dispersing medium or solvent may be evaporated by passing the sheet through a forced air circulating oven maintained at an elevated temperature, e.g. at about 150° C., to promote the efficient evaporation and deposition of an adhesion promoting coating or film upon the polyester sheet. Preferably an adhesion promoting vinylidene chloride copolymer coating of at least about 0.00005 inch thickness is produced upon the polyester sheet upon evaporation. In a particularly preferred embodiment of the invention a coating of about 0.0002 to about 0.0003 inch thickness is imparted to the polyester sheet. The presence of such a copolymer coating does not impair the transparency of the polyester sheet.

The transfer electrostatic copying technique which is used to form an adherent image upon the polyester sheet according to the present invention has become extensively utilized in the office copying field in recent years and is well known. Many offices of even modest size and/or resources have readily available the necessary equipment for efficient electrostatic copying. Such equipment which has heretofore been utilized largely to copy various documents with the image being formed upon paper may according to the present invention also be utilized to efficiently produce transparencies of excellent quality. Office personnel such as secretaries who are familiar with the operation of electrostatic copiers can form transparencies using the instant process without the need for technical training.

As is well known, transfer electrostatic copying commonly involves imparting a uniform positive electrostatic charge to photoconducting surface which will hold a charge only in the dark, such as a selenium coated drum. This may be accomplished by passing the drum under a series of corona-discharge wires in the dark. The photoconducting surface is then exposed through a lens system to a document or article bearing the image which is to be formed. In areas where light strikes the photoconducting surface the charge is dissipated and flows off through a conducting support to ground, with the positive electrostatic charge remaining largely intact in the image areas. Next negatively charged toner powder comprising a pigmented thermoplastic resin is cascaded across the photoconducting surface, and clings by electrostatic attraction to the positively charged areas of the surface. A sheet which is to receive the image is placed over the powder image, and is given a positive charge, such as by use of corona-discharge wires. As a result, a large portion of the negatively charged powder on the photoconducting surface is transferred to the sheet. Finally, the sheet is heated to melt the thermoplastic powder and bond the same to the sheet.

When it is desired to make multiple transparencies according to the present invention at a high rate of speed, the surface of each polyester sheet opposite the surface which receives the image may be covered with a transparent resinous slip coating so that the coefficient of friction between the surfaces present in a stack of the polyester sheets is lowered to insure single feeding of the same within a high speed electrostatic copier. Alternating sheets of paper or tissue with uncoated surface modified polyester sheets may also be used to insure proper feeding of the sheets into an electrostatic copier while making high speed multiple transparencies.

The following example is given as a specific illustration of invention. It should be understood, however that the invention is not limited to the specific details set forth in the example.

EXAMPLE

A transparent biaxially oriented and heat set surface modified sheet (8½ x 11 inches) of polyethylene terephthalate possessing a melting point of about 265° C., and a thickness of 0.004 inch was placed in Xerox 914 electrostatic copier. The selenium-coated drum of the copier was given a uniform positive electrostatic charge. The drum was exposed to a document bearing an intricate hand-drawn graph. Conventional thermoplastic toner powder possessing a negative charge was contacted with the surface of the drum. Next the sheet of surface modified polyethylene terephthalate was placed over the drum and given a positive electrostatic charge so that the image present upon the drum was transferred to the polyester sheet. The sheet was heated to 200° C. and the thermoplastic toner powder permanently adhered to the same to produce a transparency.

The modified surface characteristics of the polyethylene terephthalate sheet utilized in the production of the transparency were produced by coating the surface of the biaxially oriented and heat set sheet with a stable aqueous dispersion of a vinylidene chloride-methyl acrylate copolymer containing 40 percent solids by weight. The dispersion was available commercially under the trade designation of Polidene 930. The copolymer comprised about 90 percent by weight vinylidene chloride and about 10 percent by weight methyl acrylate.

The application of the vinylidene chloride copolymer was accomplished by contacting the polyethylene terephthalate sheet with a hard rubber roller which was supplied with the aqueous dispersion, and a uniform coating of the desired thickness was achieved by use of a conventional No. 4 Mayer bar. Upon placement of the sheet for two minutes in a forced air circulating oven maintained at 150° C. the water component was completely volatilized and a uniform adhesion improving coating of 0.0002 to 0.0003 inch thickness was imparted to the sheet which did not impair the transparency or color thereof.

Next a sheet of oriented and heat set transparent polyethylene terephthalate identical to that previously described with the exception that it lacked any surface modification was run through the same electrostatic copier under the same conditions as described above.

The adherency of the images present on the sheets was tested by rubbing the same vigorously with the finger. The image fixation of the transparency formed according to the present invention was good, i.e. none of the image was removed and only slight smudging resulted after repeated rubbing. The image fixation of the transparency formed upon the unmodified polyethylene terephthalate sheet was poor since the image was partially removed and smudged excessively under finger pressure.

The transparencies formed according to the present invention if desired may be mounted in frames of various sizes and used in conventional visual education projectors or for the preparation of tracings. It is also possible for a series of images to be formed adjacent each other on a roll of surface modified polyester sheet and the resulting transparency roll viewed by use of an overhead projector, or the like.

Although the invention has been described with preferred embodiments, it will be understood that variations and modifications may be resorted to as will be apparent to those skilled in the art. Such variations and modifications are to be considered within the purview and scope of the claims appended hereto:

We claim:

1. In a method for producing a transparency comprising forming an adherent image upon a surface of a transparent polyester sheet by transfer electrostatic copying, the polyester comprising the condensation product of a bifunctional aromatic dicarboxylic acid and a dihydric alcohol, the improvement which comprises modifying at least one surface of said polyester sheet to improve adhesion by the presence of a vinylidene chloride copolymer coating thereon containing about 35 to 97 percent by weight of vinylidene chloride and about 3 to 65 percent by weight of a comonomer having the general formula of

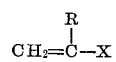

wherein R is hydrogen or a methyl group, X is

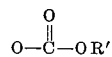

or C≡N, and R' is a $C_1$ to $C_{18}$ alkyl group.

2. In a method for producing a transparency comprising forming an adherent image upon a surface of a transparent oriented and heat set highly polymeric linear polyethylene terephthalate sheet by transfer electrostatic copying, the improvement which comprises modifying at least one surface of said polyethylene terephthalate sheet to improve adhesion by the presence of a vinylidene chloride copolymer coating thereon containing about 75 to 95 percent by weight vinylidene chloride and about 5 to 25 percent by weight of a comonomer having a general formula of

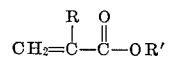

wherein R is hydrogen or a methyl group, and R' is a $C_1$ to $C_8$ alkyl group.

3. A transparency prepared by forming an adherent image upon a surface of a transparent polyester sheet by transfer electrostatic copying, wherein said polyester is a condensation product of a bifunctional dicarboxylic acid and a dihydric alcohol, said polyester sheet having at least one surface modified to improve adhesion by the presence of a vinylidene chloride copolymer coating thereon containing about 35 to 97 percent by weight of vinylidene chloride and about 3 to 65 percent by weight of a comonomer having the general formula of

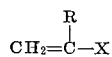

wherein R is hydrogen or a methyl group, X is

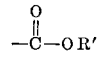

or C≡N, and R' is a $C_1$ to $C_{18}$ alkyl group.

4. A method according to claim 1 wherein said polyester sheet is an oriented and heat set highly polymeric linear polyethylene terephthalate.

5. A method according to claim 1 wherein said polyester sheet has a coating thereon of a vinylidene chloride copolymer containing about 75 to 95 percent by weight vinylidene chloride and about 5 to 25 percent by weight of said comonomer.

6. A method according to claim 1 wherein said comonomer is methyl acrylate.

7. A method according to claim 2 wherein said polyethylene terephthalate sheet has a vinylidene chloride copolymer coating thereon containing about 90 percent by weight vinylidene chloride and about 10 percent by weight of said comonomer.

8. A method according to claim 7 wherein said comonomer is methyl acrylate.

9. A transparency according to claim 3 wherein said transparent polyester sheet is an oriented and heat set highly polymeric linear polyethylene terephthalate.

References Cited

UNITED STATES PATENTS

| 3,275,436 | 9/1966 | Mayer | 96—1 |
| 3,269,994 | 8/1966 | Horn et al. | 260—86.1 |

GEORGE F. LESMES, Primary Examiner

M. B. WITTENBERG, Assistant Examiner

U.S. Cl. X.R.

96—1; 117—72, 211; 260—86.3, 85.5